United States Patent [19]

Dehne et al.

[11] 4,175,657

[45] Nov. 27, 1979

[54] DRIVE UNIT FOR A CONVEYOR CHAIN

[75] Inventors: Clarence A. Dehne, Farmington Hills; Martin Pachuta, Troy, both of Mich.

[73] Assignee: Jervis B. Webb Company, Farmington Hills, Mich.

[21] Appl. No.: 869,218

[22] Filed: Jan. 13, 1978

[51] Int. Cl.² .............................................. B65G 23/14
[52] U.S. Cl. .................................... 198/833; 198/856
[58] Field of Search .............. 198/684, 685, 687, 833, 198/856; 104/165, 172 R, 172 S

[56] References Cited

U.S. PATENT DOCUMENTS

| | | | |
|---|---|---|---|
| 1,847,152 | 3/1932 | Webb et al. | 198/833 |
| 2,130,433 | 9/1938 | Webb | 198/684 |
| 2,168,852 | 8/1939 | Webb et al. | 198/684 |
| 2,918,020 | 12/1959 | Henderson et al. | 198/833 |

*Primary Examiner*—Jeffrey V. Nase
*Attorney, Agent, or Firm*—Joseph W. Farley

[57] ABSTRACT

A conveyor chain drive unit having a main frame formed essentially by an H-section structural member whose flanges provide a pair of vertical plates located on either side of the path of travel of the conveyor chain. A bearing mounted on one of these plates supports the vertically extending output shaft of a reducer with the reducer housing positioned above the main frame. Connected to the reducer housing is a movable frame which extends radially outward from the axis of the reducer output shaft and supports a motor for driving the reducer. The conveyor chain is engaged by a caterpillar type of drive chain trained about a drive sprocket on the reducer output shaft and about a take-up sprocket and a back-up bar both mounted on the one side plate of the main frame. A roller nest carried by the opposite main frame side plate holds the conveyor chain in engagement with the drive chain. The movable frame pivots about the axis of the reducer output shaft in response to the driving torque thereon; and this pivotal movement is restrained by a compression spring and shock absorber. Excess pivotal movement is sensed as an overload condition.

10 Claims, 10 Drawing Figures

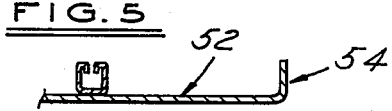
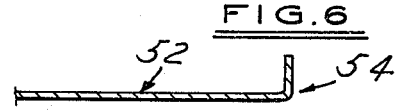
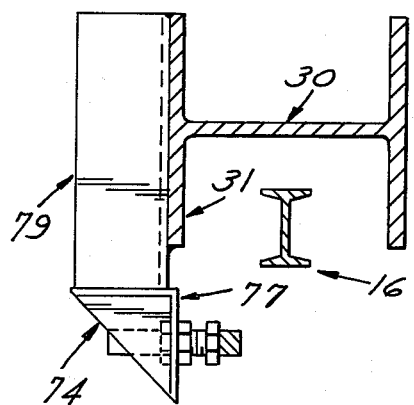
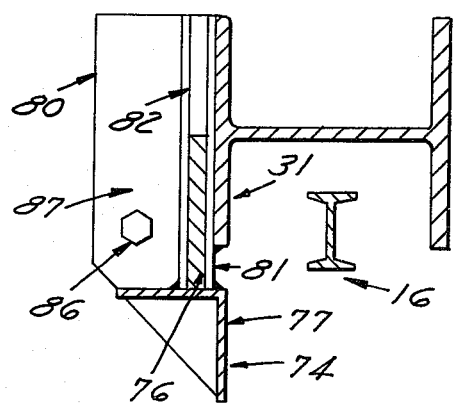
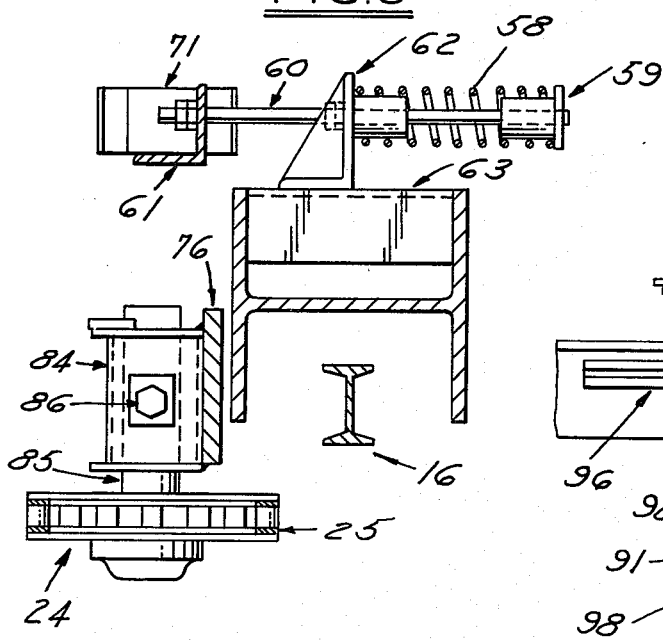
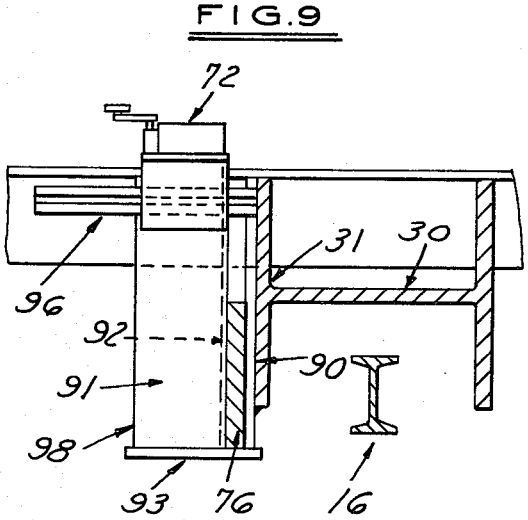
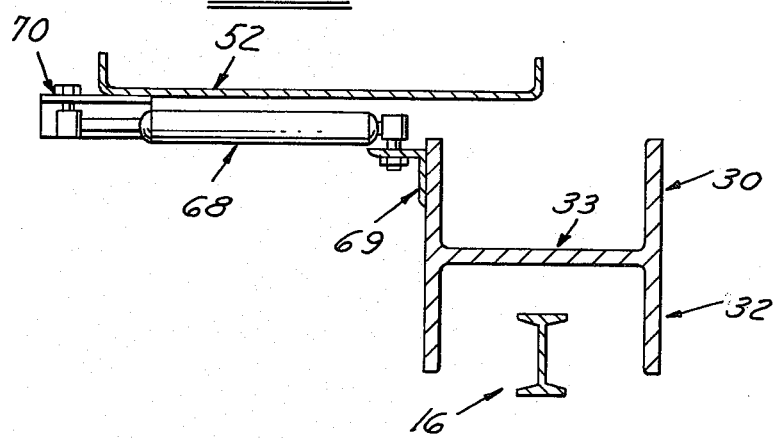

DRIVE UNIT FOR A CONVEYOR CHAIN

This invention relates to an improved conveyor chain drive unit of the type having a fixed frame and a movable frame, with movement of the movable frame being used for some control function such as shutting off the drive unit in case of an overload condition.

Conveyor drive units of this general type have been employed in the conveyor industry for some years, prior examples being shown in U.S. Pat. Nos. 1,847,152 and 2,130,433. In the first of these prior patents, the conveyor chain is engaged by a so-called "caterpillar" drive chain which is trained about a driving sprocket, an idler or take-up sprocket, and is guided into engagement with the conveyor chain by a back-up bar located between these two sprockets. The driving sprocket is connected to the output shaft of a reducer, driven by a motor through a variable speed transmission. All of these components of the drive unit are mounted on a floating frame which is carried by a fixed frame and is movable thereon in a linear direction opposite to the direction of movement of the conveyor chain in response to the driving reaction between the caterpillar drive chain and the conveyor chain. This movement of the floating frame is opposed by suitable springs, and excess movement is detected and used for overload protection.

In the second of the aforementioned patents, the conveyor chain is engaged by a sprocket connected to the output shaft of a reducer which is also driven from a motor through a variable speed transmission. All of these driving components are again mounted on a floating frame carried by a fixed frame. The floating frame pivots about the output shaft of the reducer in response to the driving torque thereon, and again, excess movement is employed for overload protection.

The present invention is directed primarily to improvements in a conveyor drive unit employing the caterpillar type of drive chain rather than a sprocket, and the overall objects of the invention are to provide a greatly simplified construction for such a drive unit offering improved ease of maintenance, overload protection and versatility.

The drive unit of the invention is designed to propel a conveyor chain along a path defined by a conveyor track, and includes the conventional components of such a drive unit - a drive means for engaging the conveyor chain, a reducer having an input shaft, a housing and an output shaft connected to the chain drive means, and a motor driving the reducer input shaft. The improved construction comprises a fixed frame, and bearing means carried by the fixed frame for supporting the reducer by the output shaft thereof with the reducer housing spaced from the fixed frame. In the presently preferred construction disclosed and to be described herein, the bearing means defines a vertical axis and includes thrust means coacting with the reducer output shaft for supporting the output shaft vertically and positioning the reducer housing above the fixed frame. A movable frame is attached directly to the reducer housing and forms an arm which extends radially from the axis of the reducer output shaft and which is movable about this axis in reaction to torque on the output shaft. Suitable means is provided on the movable frame for mounting the reducer driving motor, and resilient means opposes movement of the movable frame in reaction to said torque. Excess movement of the movable frame is sensed by suitable means such as a limit switch, for overload protection.

Preferably, the fixed frame essentially consists of one main structural member, of H-shape in section, which is mounted so that its flanges form vertically extending side plates integrally joined together by its horizontally extending web. The bearing means for supporting the reducer output shaft is attached to one of the side plates as also are the take-up sprocket and back-up bar of a caterpillar chain drive. The other side plate supports a roller nest for positioning the conveyor chain laterally relative to the caterpillar drive chain. This results in an extremely simple and strong construction with the movable frame being sensitive to any form of overload condition that may occur.

Other features and advantages of the invention will appear from the description to follow of the presently preferred embodiment shown in the accompanying drawings.

DESCRIPTION OF THE DRAWINGS

FIGS. 5, 6, 7, 8 and 9 are transverse sectional details taken respectively on the lines 5—5, 6—6, 7—7, 8—8 and 9—9 of FIG. 2.

DESCRIPTION OF THE PREFERRED EMBODIMENT

Figure 1:
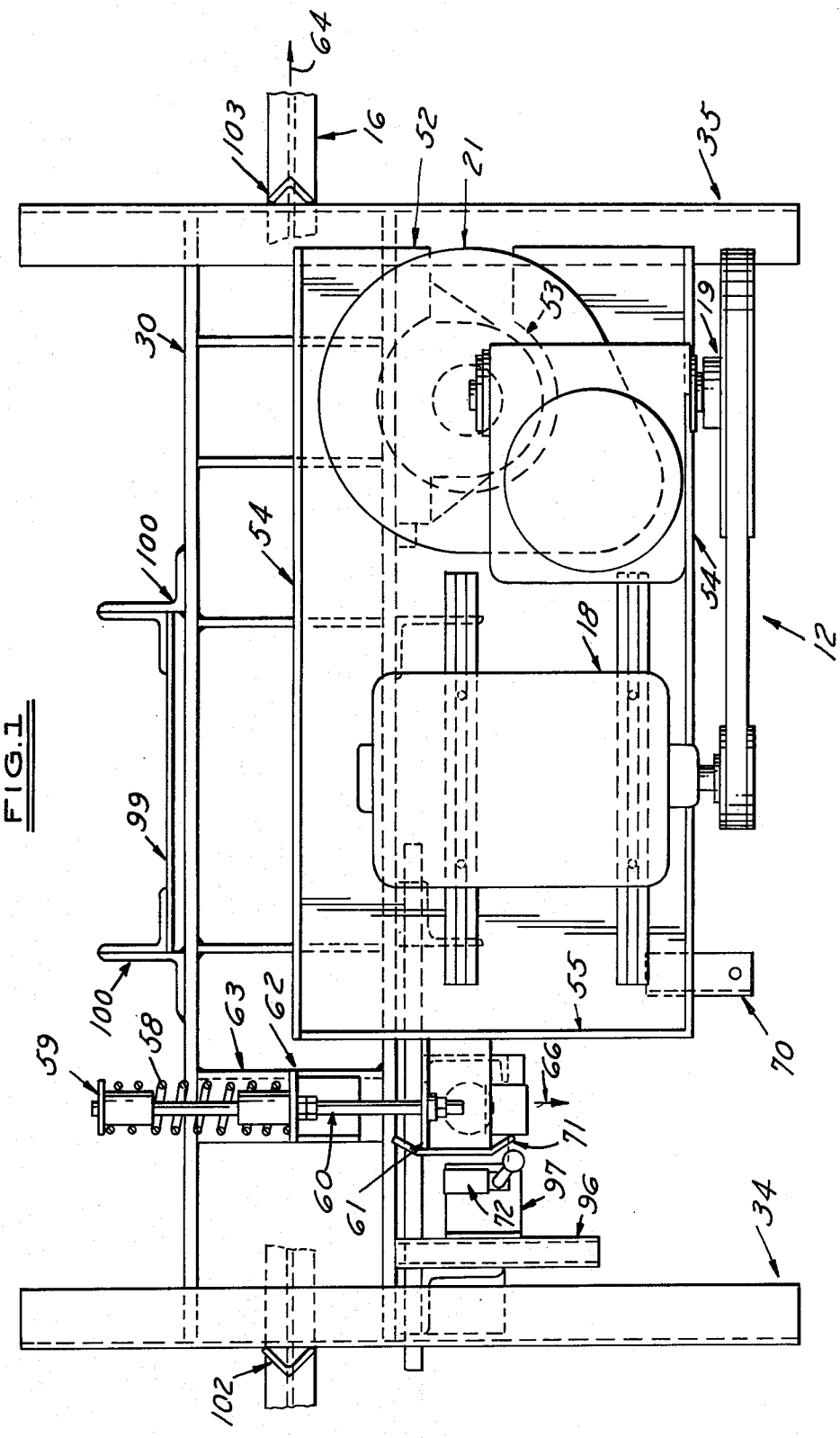
FIG. 1 is a plan view of a drive unit constructed in accordance with the invention.
Figure 2:
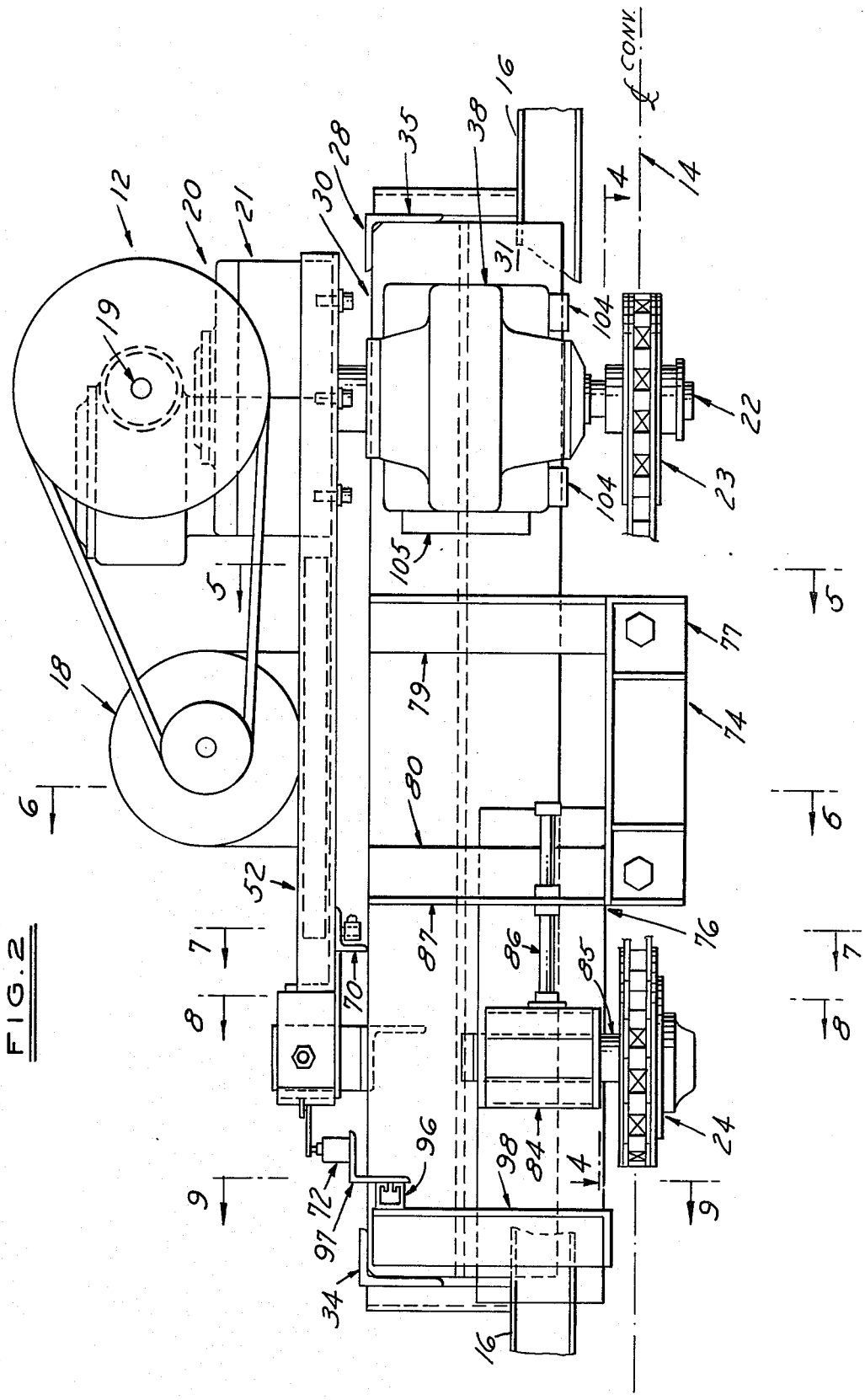
FIG. 2 is a side elevation thereof.
Figure 3:
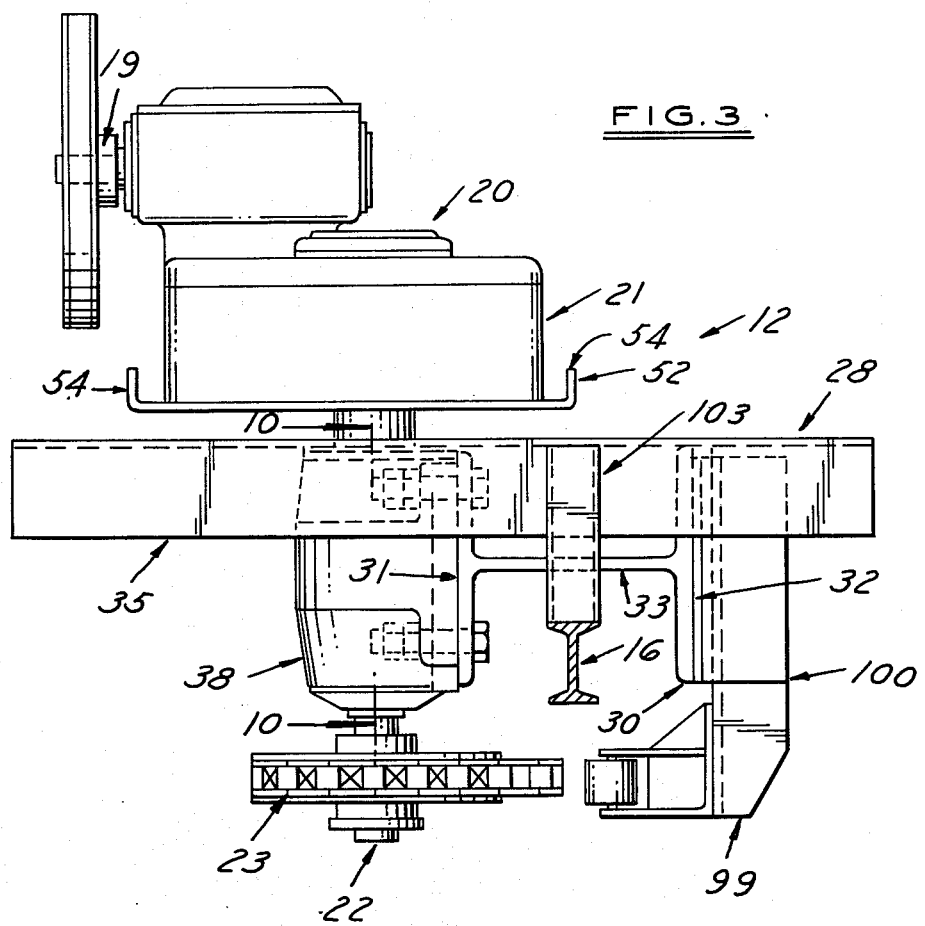
FIG. 3 is an end elevation thereof.

The drive unit 12 shown in FIGS. 1-3 is designed to propel a conveyor chain 14 along a path defined by a conveyor track 16. Only that portion of the conveyor track 16 in the vicinity of the drive unit 12 is shown in these views, and the conveyor chain 14, being conventional, is represented by a broken line. Ordinarily the conveyor chain 14 consists of alternate center links and pairs of side bars connected together by pins, and the chain 14 is supported from the conveyor track 16 by trolleys (not shown) rolling on the lower flanges of the track 14 and connected at suitable intervals to the center links of the chain.

Figure 4:
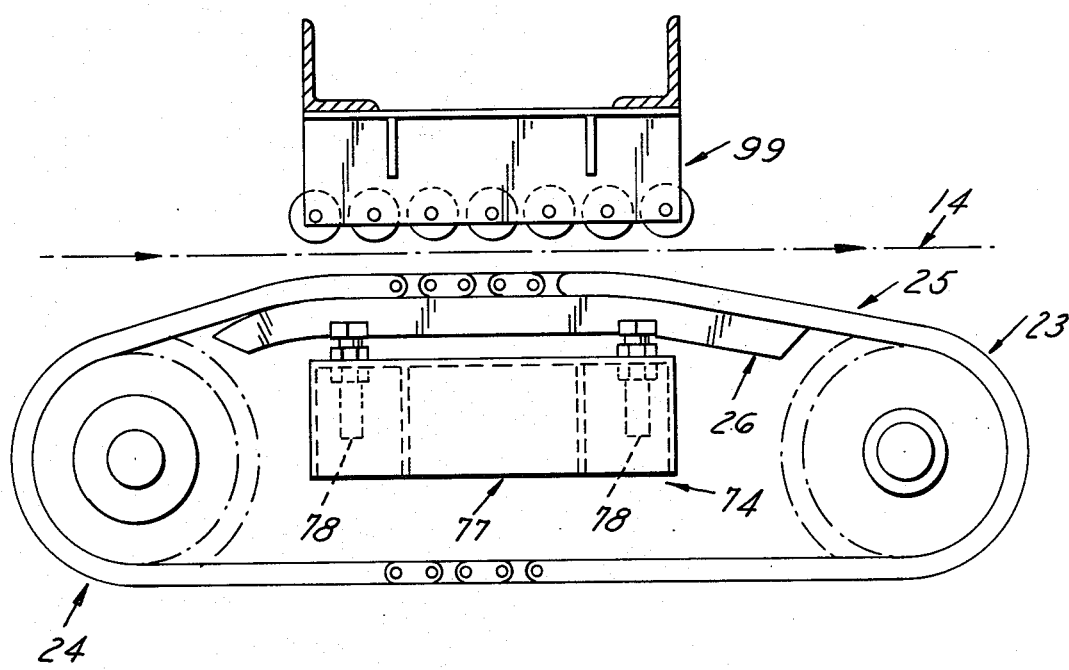
FIG. 4 is a sectional plan view taken as indicated by the line 4—4 of FIG. 2.

Conventional components of the drive unit 12 include a drive motor 18 drivingly connected to the input shaft 19 of a reducer 20 having a housing 21 and an output shaft 22 connected to a driving sprocket 23 of caterpillar type drive means for engaging the chain 14, as shown in FIG. 4. Other components of the caterpillar drive include an idler or take-up sprocket 24, a drive chain 25 trained about the sprockets 23 and 24 and provided with driving dogs (not shown) which engage the conveyor chain 14 in a path of motion defined by a back-up bar 26. A new and improved mounting of, and interrelationship between, the foregoing conventional components are provided in the drive unit 12 of the invention, as described below.

The drive unit 12 has a fixed frame 28 formed primarily and preferably by a single structural backbone member 30. This member 30 is a structural section of H-shape (FIG. 3) extending longitudinally parallel to the conveyor track 16 and mounted so that its flanges form vertically extending side plates 31 and 32 integrally joined by the web 33. One of a pair of transverse members 34 and 35 is attached to each end of the frame member 30 for mounting the drive unit 12 on the conveyor supporting structure (not shown).

Figure 10:
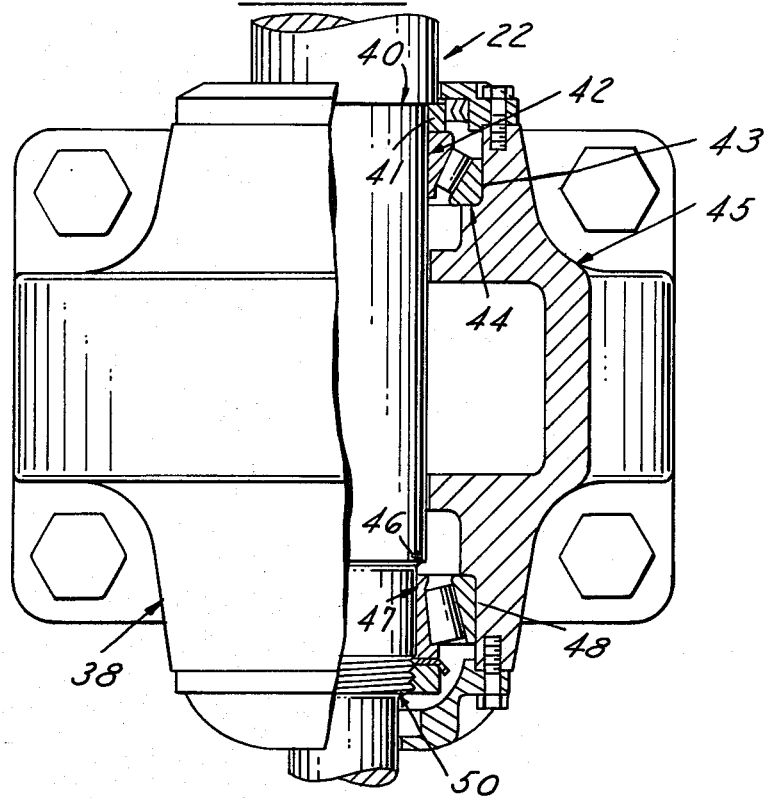
FIG. 10 is a sectional detail taken on the line 10—10 of FIG. 3.

A bearing means 38 is bolted to the fixed frame side plate 31, as shown in FIGS. 2 and 3, and supports the reducer 20 by the reducer output shaft 22 with the reducer housing 21 spaced above the fixed frame 28. The bearing 38 and reducer output shaft 22 are of special design and are shown in FIG. 10. The shaft 22 is progressively stepped down in diameter from a maximum diameter at the reducer housing 21 through a first reduction defined by a shoulder 40 on the shaft. A thrust ring 41 engages the shoulder 40 and is in turn engaged by the inner race 42 of a tapered roller bearing whose outer race 43 is seated in a step 44 formed in the case 45 of the bearing 38. A second reduction in the diameter of the shaft 22 at a shoulder 46 provides a diameter 47 at which the shaft is engaged by a second tapered roller bearing 48. The shaft 22 then steps down at a shoulder 50 to the diameter at which it engages the drive sprocket 23.

A movable frame 52 is bolted directly to the housing 21 of the reducer 20, as best shown in FIGS. 2 and 3, and consists of a plate-like member having a keyhole-shaped aperture 53 formed in one end thereof for receiving the reducer output shaft 22, a pair of upstanding side flanges 54, and an upstanding end flange 55. This movable frame extends radially from the axis of the reducer output shaft 22 parallel to the main frame 28, and forms an arm which is movable with the reducer housing 21 about the axis of the reducer output shaft 22 in reaction to torque thereon. The motor 18 is mounted on the movable frame.

Pivotal movement of the movable frame 52 about the axis of the reducer output shaft 22 is resiliently opposed by a compression spring 58 (FIGS. 1 and 8) engaged by a plate 59 carried by a rod 60 attached to a bracket 61 on the free end of the movable frame 52, the spring acting against a bracket 62 secured to a cross member 63 on the fixed frame member 30. With a drive unit 12 arranged as shown, the direction of travel of the chain is indicated by the arrow 64 in FIG. 1, and pivotal movement of the movable frame 52 in reaction to torque on the output shaft 22 of the reducer is in the direction of the arrow 66. Pivotal movement of the movable frame is further resiliently restrained by a shock absorber or damper 68 (FIG. 7) mounted between a bracket 69 on the side 31 of the main frame member 30 and a bracket 70 on the movable frame 52. A cam 71 carried by the bracket 61 of the movable frame is engageable with a sensing device such as a limit switch 72 in the event of pivotal movement of the movable frame in excess of a desired amount, thus providing overload protection for the drive unit 12 by connecting the limit switch 72 in the operating circuit for the drive motor 18, as is known in the art.

Other components of the drive unit 12 are mounted on the side plates 31 and 32 of the main frame member 30. On the side plate 31, in addition to the bearing 38, are mounted a support 74 for the back-up bar 26 and a slidable plate 76 for supporting the take-up sprocket 24.

The support 74 for the back-up bar 26 is shown in FIGS. 2 and 4 and consists of a horizontal member 77 to which the back-up bar 26 is adjustably connected by bolts 78 and which is in turn connected to a pair of vertical struts 79 and 80. The strut 79 is directly connected to the side plate 31 of the main frame member 30, as shown in FIG. 5; and, the vertical strut 80 is connected to the side plate 31 of the main frame member 30 in spaced relation to a guide plate 81 carried thereby, as shown in FIG. 6. Parallel surfaces 82 on the strut 80 and on the guide plate 81 thus form guides for the slidable plate 76 which is supported vertically by the upper surface of the back-up bar support member 77. A bearing 84 is attached to the slidable plate 76 as shown in FIG. 8, and supports a shaft 85 for the idler sprocket 24. Attached to the bearing 84 is an adjusting bolt 86 which extends through a flange 87 on the vertical strut 80, as shown in FIGS. 2 and 6. FIG. 9 shows a second support for the slidable plate 76. A guide plate 90 is mounted directly on the side plate 31 of the frame member 30; spaced outwardly from the guide plate 90 is a vertical strut 91 having a flange 92 extending parallel to the guide plate 90; and, a bottom plate 93 for supporting the member 76 vertically is attached to the lower ends of the guide plate 90 and vertical strut 91. A support member 96 for a bracket 97, on which the limit switch 72 is mounted, is secured to the flange 98 of the vertical strut 91, as best shown in FIG. 2.

As shown in FIGS. 1, 3 and 4, a roller nest assembly 99 is mounted between a pair of vertically extending support members 100 secured to the other side plate 32 of the main frame member 30. This roller nest 99 acts to prevent the conveyor chain 14 from moving laterally out of engagement with the drive chain 25, and the conveyor track 16 is mounted within the main frame 30, being supported by vertical brackets 102 and 103 mounted on the transverse frame members 34 and 35, respectively, as best shown in FIGS. 1-3.

Among the more important features and advantages of this construction are the following:

(1) The single main frame member 30 provides a rugged backbone type of design and a frame which is considerably smaller and requires less fabrication than conventional constructions. One size of frame can be used with different sizes of reducers.

(2) The I-beam conveyor track member 16 is mounted within the frame member 30; the reducer, back-up bar and caterpillar chain drive components are mounted on the one side 31 of the frame member 30; and, the roller nest 99 is mounted on the other side 32 of the frame member 30. Thus the frame member 30 accurately spaces these components relative to each other.

(3) Practically all of the components of the drive assembly are freely accessible for maintenance purposes from the sides thereof, with most of these components being accessible from one side. This is particularly important in the case of the reducer, which can be removed by simply unbolting the bearing 38 from the fixed frame 30 and moving the entire reducer and floating frame assembly sidewards. Support and locating blocks 104 and 105 (FIG. 2) are mounted on the side plate 31 of the frame member 30 to simplify this operation.

(4) The rotatable movable frame 52 supported by the housing 21 of the reducer results in a greatly simplified construction of the movable frame, and also results in improved overload protection. The movable frame is directly responsive to torque on the reducer output shaft, and thereby senses any type of overload condition including a jam within the components of the caterpillar chain drive. The overload protection is also more sensitive and exact because the movable frame 52 pivots on the tapered roller bearing assembly 38.

Other features and advantages of the invention will be apparent to those skilled in the art.

We claim:

1. In a drive unit for propelling a conveyor chain along a path defined by a conveyor track, said drive unit including a fixed frame and drive means supported thereby for engaging the conveyor chain; a reducer having an output shaft connected to the drive means, an input shaft, and a housing; a motor drivingly connected to the input shaft; and means supporting the motor and reducer for resiliently opposed pivotal movement about the axis of the reducer output shaft in response to torque thereon; the improvement wherein:
   said means supporting the motor and reducer comprises bearing means carried by the fixed frame for supporting the reducer housing by the reducer output shaft with the housing spaced from the fixed frame;
   a movable frame attached to and supported by the reducer housing, said movable frame forming a cantilever arm which extends in radial relation to the axis of the reducer output shaft and which pivots about said axis with the reducer housing in response to torque on the reducer output shaft; and,
   means for mounting the motor on said movable frame.

2. A drive unit according to claim 1 further comprising sensing means operable in response to movement of the movable frame in excess of a desired amount.

3. A drive unit according to claim 1, wherein said fixed frame comprises a pair of side plates extending longitudinally parallel to the conveyor track and rigidly connected in transversely spaced relation,
   track supporting means positions the conveyor track between said side plates, and
   said bearing means is attached to one of said side plates.

4. A drive unit according to claim 3, wherein said bearing means defines a vertically extending axis of rotation for said reducer output shaft and includes thrust means coacting with said output shaft for supporting the reducer housing, the movable frame and the motor above the fixed frame.

5. A drive unit according to claim 3, wherein said fixed frame includes an H-section structure having side flanges forming said pair of side plates and a transverse web rigidly connecting said side plates.

6. A drive unit according to claim 3, wherein said drive means for engaging the conveyor chain comprises a drive sprocket mounted on said reducer output shaft, an idler sprocket, idler sprocket mounting means carried by said one side plate of the fixed frame for positioning said idler sprocket in longitudinally spaced relation with said drive sprocket, a conveyor drive chain trained about said drive and idler sprockets, and back-up means supported by said one side plate of the fixed frame for defining the driving path of movement of said conveyor drive chain.

7. A drive unit according to claim 6, wherein said idler sprocket mounting means includes a slidably supported member extending parallel to said one side plate of the fixed frame, a bearing secured to said member an idler shaft mounted in said bearing, and adjustable means for positioning said plate longitudinally of the fixed frame.

8. A drive unit according to claim 6 further comprising a roller nest carried by the other side plate of the fixed frame in opposed relation to said back-up means.

9. A drive unit according to claim 1, wherein said movable frame comprises a plate-like member having an aperture formed therein adjacent one end thereof for receiving the output shaft of the reducer, said means for mounting the motor being carried by said plate-like member in radially spaced relation to the axis of said output shaft.

10. A drive unit according to claim 1, wherein a damper is connected between the fixed and movable frames.

* * * * *

UNITED STATES PATENT AND TRADEMARK OFFICE
CERTIFICATE OF CORRECTION

PATENT NO. : 4,175,657
DATED : November 27, 1979
INVENTOR(S) : CLARENCE A. DEHNE ET AL It is certified that error appears in the above—identified patent and that said Letters Patent is hereby corrected as shown below:

Column 2, line 13, after "construction" insert a comma (,);

Column 6, line 23, "plate" should read -- member --.

Signed and Sealed this

Fifteenth Day of April 1980

[SEAL]

Attest:

SIDNEY A. DIAMOND

Attesting Officer

Commissioner of Patents and Trademarks